US012488741B2

(12) United States Patent
Lin et al.

(10) Patent No.: US 12,488,741 B2
(45) Date of Patent: Dec. 2, 2025

(54) LIGHT-EMITTING SIGNAL GENERATING CIRCUIT AND DISPLAY DEVICE

(71) Applicant: AUO Corporation, Hsinchu (TW)

(72) Inventors: Wei-Li Lin, Hsinchu (TW); Yen-Wei Yeh, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/910,003

(22) Filed: Oct. 9, 2024

(65) Prior Publication Data

US 2025/0191526 A1 Jun. 12, 2025

(30) Foreign Application Priority Data

Dec. 11, 2023 (TW) ................................ 112148177

(51) Int. Cl.
*G09G 3/32* (2016.01)

(52) U.S. Cl.
CPC ....... *G09G 3/32* (2013.01); *G09G 2300/0852* (2013.01); *G09G 2300/0861* (2013.01)

(58) Field of Classification Search
CPC ......... G09G 3/3233; G09G 2300/0861; G09G 3/3266; G09G 2300/0819; G09G 2300/0842; G09G 2310/08; G09G 2310/0286; G09G 2310/0262; G09G 2320/0233; G09G 2300/0852; G09G 2300/0426; G09G 2330/021; G09G 2310/0251; G09G 3/3291; G09G 3/32
See application file for complete search history.

(56) References Cited

U.S. PATENT DOCUMENTS

2018/0130541 A1* 5/2018 Li .......................... G11C 19/28
2019/0165675 A1* 5/2019 Pyun .................... G09G 3/3648
2021/0358361 A1* 11/2021 Luo .......................... G09G 3/20
2021/0390912 A1* 12/2021 Woo ..................... G09G 3/3225
2022/0059014 A1* 2/2022 Kuo ......................... G09G 3/32
2024/0169924 A1* 5/2024 Shang .................... H10D 86/00

FOREIGN PATENT DOCUMENTS

CN 115719581 A 2/2023
TW 201532021 A 8/2015
TW 202418249 A 5/2024

OTHER PUBLICATIONS

Che-Wei Tung et al., "Display", U.S. Appl. No. 18/396,761, filed Dec. 27, 2023, Applicant: AUO Corporation.

* cited by examiner

*Primary Examiner* — Sujit Shah
(74) *Attorney, Agent, or Firm* — WPAT, PC

(57) ABSTRACT

A light-emitting signal generating circuit includes a first transistor, having a first terminal for receiving a first light-emitting signal, a gate terminal for receiving a first clock signal, and a second terminal that generates a control signal; a second transistor that has a first terminal for receiving a first reference voltage, a gate terminal, and a second terminal for outputting a second light-emitting signal; a first capacitor having a first terminal for receiving a second clock signal, and a second terminal coupled to the second terminal of the first transistor and a gate terminal of the second transistor, wherein a low level period of the first clock signal partially overlaps with a low level period of the second clock signal, and a falling edge of the second clock signal lags behind a falling edge of the first clock signal.

15 Claims, 8 Drawing Sheets

1201b

LIGHT-EMITTING SIGNAL GENERATING CIRCUIT AND DISPLAY DEVICE

CROSS-REFERENCE TO RELATED APPLICATION

This application claims priority to Taiwan Application Serial Number 112148177, filed Dec. 11, 2023, which is herein incorporated by reference in its entirety.

BACKGROUND

Field of Invention

This disclosure relates to a light-emitting signal generating circuit and a display device, and in particular to reducing the impact of threshold voltage shift on circuit driving.

Description of Related Art

When the driving thin film transistor (TFT) designed by enhanced pulse width modulator (EPWM) operates in saturation region, the output waveform would be affected by threshold voltage of TFT. As the operation time increases, the TFT would have threshold voltage shift, and causes fall time of EPWM output to change over time.

SUMMARY

A light-emitting signal generating circuit includes a first transistor, a second transistor and a first capacitor. The first transistor includes a first terminal for receiving a first light-emitting signal, a gate terminal for receiving a first clock signal, and a second terminal for generating a control signal; the second transistor includes a first terminal for receiving a first reference voltage, a gate terminal, and a second terminal for outputting a second light-emitting signal; and the first capacitor includes a first terminal for receiving a second clock signal and a second terminal coupled to the second terminal of the first transistor and the gate terminal of the second transistor. A low level period of the first clock signal partially overlaps with a low level period of the second clock signal, and a falling edge of the second clock signal lags behind a falling edge of the first clock signal.

In some embodiments, the second transistor lowers a level of the second light-emitting signal.

In some embodiments, when the first clock signal conducts the first transistor and causes the control signal switching to a low level but the control signal is not at a steady-state low level yet, the control signal is pulled down through a coupling effect of the first capacitor based on the falling edge of the second clock signal.

In some embodiments, when the control signal is pulled down through the coupling effect of the first capacitor based on the falling edge of the second clock signal, the second transistor is operated in linear region.

In some embodiments, a delay time length by which the falling edge of the second clock signal lags behind the falling edge of the first clock signal is less than half cycle of the first clock signal or less than a data signal length.

In some embodiments, the data signal length is 28 microseconds (us).

In some embodiments, the light-emitting signal generating circuit further includes a third transistor and a fourth transistor. The third transistor includes a first terminal for receiving the first light-emitting signal, a gate terminal for receiving a first scanning signal and a second terminal; and the fourth transistor includes a first terminal, a gate terminal for receiving a second scanning signal, and a second terminal for receiving a third light-emitting signal.

In some embodiments, the light-emitting signal generating circuit further includes a discharging module. The discharging module is electrically coupled to the second terminal of the second transistor, the discharging module pulls up the second light-emitting signal according to the falling edge of the first clock signal.

In some embodiments, the discharging module further includes a third transistor. The third transistor includes a gate terminal for receiving the first light-emitting signal, a first terminal for adjusting a second control signal in response to the first light-emitting signal, and a second terminal for receiving a second reference voltage.

A display device includes a plurality of pixel units, a plurality of light-emitting signal generating circuits and a delay circuit. Each of the light-emitting signal generating circuits includes a first transistor, a second transistor and a first capacitor. The first transistor includes a first terminal for receiving a previous stage light-emitting signal, a gate terminal for receiving a first clock signal, and a second terminal for generating a control signal; the second transistor includes a first terminal for receiving a first reference voltage, a gate terminal, and a second terminal for outputting a present stage light-emitting signal to one of the pixel units; and the first capacitor includes a first terminal for receiving a second clock signal and a second terminal coupled to the second terminal of the first transistor and the gate terminal of the second transistor. The delay circuit delays the first clock signal to generate a second clock signal and transmit the second clock signal to the light-emitting signal generating circuits, wherein a low level period of the first clock signal partially overlaps with a low level period of the second clock signal, and a falling edge of the second clock signal lags behind a falling edge of the first clock signal.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
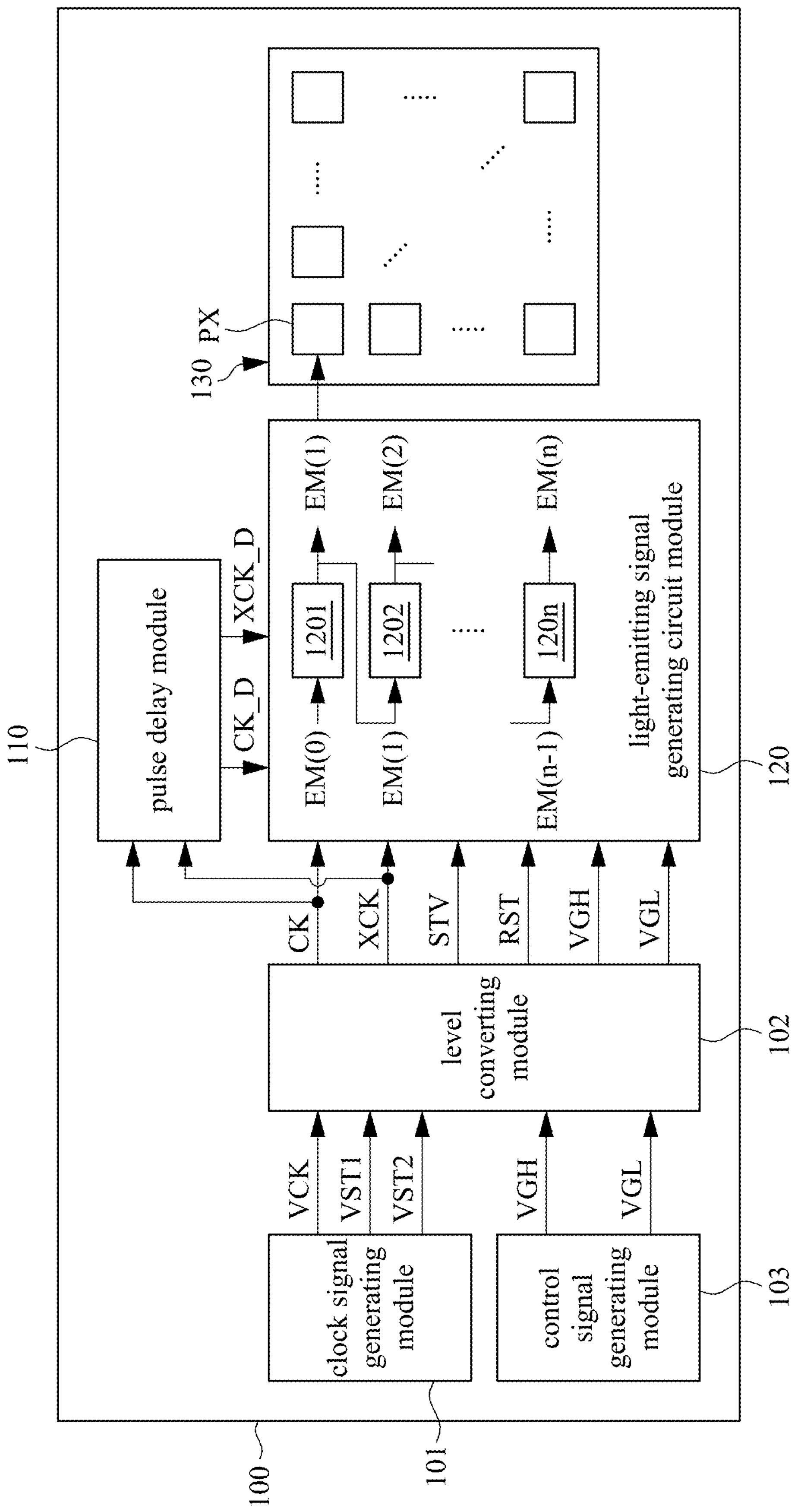
FIG. 1 is a system diagram of a display device in accordance with some embodiments of the present disclosure.

FIG. 1 is a system diagram of a display device 100 in accordance with some embodiments of the present disclosure. Referring to FIG. 1, the display device 100 includes a clock signal generating module 101, a level converting module 102, a control signal generating module 103, a pulse delay module 110, a light-emitting signal generating circuit module 120, and an image displaying module 130.

The clock signal generating module 101 is coupled to the level converting module 102, and the clock signal generating module 101 outputs a baseband signal VCK, a start signal VST1 and a start signal VST2 to the level converting module 102.

The control signal generating module 103 is coupled to the level converting module 102, and outputs a reference voltage VGL and a reference voltage VGH to the level converting module 102.

The level converting module 102 outputs a clock signal CK, a clock signal XCK, a start signal STV, a reset signal RST, the reference voltage VGH and the reference voltage VGL to the light-emitting signal generating circuit module 120 according to the received baseband signal VCK, the start signal VST1, the start signal VST2, and the reference voltages VGH and the reference voltage VGL.

In addition of outputting the clock signals CK and XCK to the light-emitting signal generating circuit module 120, the level converting module 102 also outputs the clock signals CK and XCK to the pulse delay module 110. In some embodiments, the pulse delay module 110 receives the clock signal CK and generates a clock signal CK_D that is lagged behind the clock signal CK by a delay time D, and the pulse delay module 110 outputs the clock signal CK_D to the light-emitting signal generating circuit module 120. In some embodiments, the length of the delay time D may be 1 microsecond (us). A low (or high) level period of the clock signal CK partially overlaps with a low (high) level period of the clock signal CK_D, and a falling edge of the clock signal CK_D lags behind a falling edge of the clock signal CK. Similarly, the pulse delay module 110 receives the clock signal XCK and generates a clock signal XCK_D that is lagged behind the clock signal XCK by a delay time D, and the pulse delay module 110 outputs the clock signal XCK_D to the light-emitting signal generating circuit module 120. Rest of the configurations of the clock signals XCK and XCK_D are similar to the clock signals CK and CK_D. For the sake of simplicity, they would not be repeated here.

The light-emitting signal generating circuit module 120 generates light-emitting signals EM(0)-EM(n) by inputting each signal and combining the clock signals CK, CK_D, XCK and XCK_D to control the image displaying module 130. For example, the light-emitting signal generating circuit module 120 configures the received start signal STV as the light-emitting signal EM(0). In some embodiments, the light-emitting signal generating circuit module 120 includes a plurality of light-emitting signal generating circuits 1201-120*n*, which the value 'n' can be any positive integer greater than one. The light-emitting signal generating circuits 1201-120*n* sequentially provide and enable the light-emitting signals EM(1)-EM(n) to the image displaying module 130. In some embodiments, each of the light-emitting signal generating circuits 1201-120*n* has a similar configuration.

In some embodiments, the odd-numbered stage circuits in the light-emitting signal generation circuits 1201-120*n* (i.e., the light-emitting signal generation circuits 1201 and 1203, etc.) response to the clock signals CK and CK_D to generate the light-emitting signals EM(1) and EM(3), etc., and the even-numbered stage circuits (i.e., the light-emitting signal generation circuits 1202 and 1204, etc.) response to the clock signals XCK and XCK_D to generate the light-emitting signals EM(2) and EM(4), etc.

In some embodiments, the light-emitting signal (i.e., the light-emitting signal EM(1)) output by the previous stage (i.e., the light-emitting signal generating circuit 1201) in the light-emitting signal generating circuits 1201-120*n* is also configured to be input signal of the next stage (i.e., the signal generating circuit 1202), and so on.

As shown in FIG. 1, the image displaying module 130 includes a plurality of pixel units PX, and the pixel units PX are arranged in an array. In some embodiments, the pixel units PX are light-emitting diode pixels (i.e., the pixel units PX are configured with micro light-emitting diode pixels).

In terms of operation, the light-emitting signal generating circuit module 120 drives the pixel unit PX that is written a pixel voltage to cause the pixel unit PX to emit light. Each of the light emitting signals EM(1)-EM(n) is provided to a plurality of adjacent pixel units PX among the plurality of pixel units PX.

Figure 2:
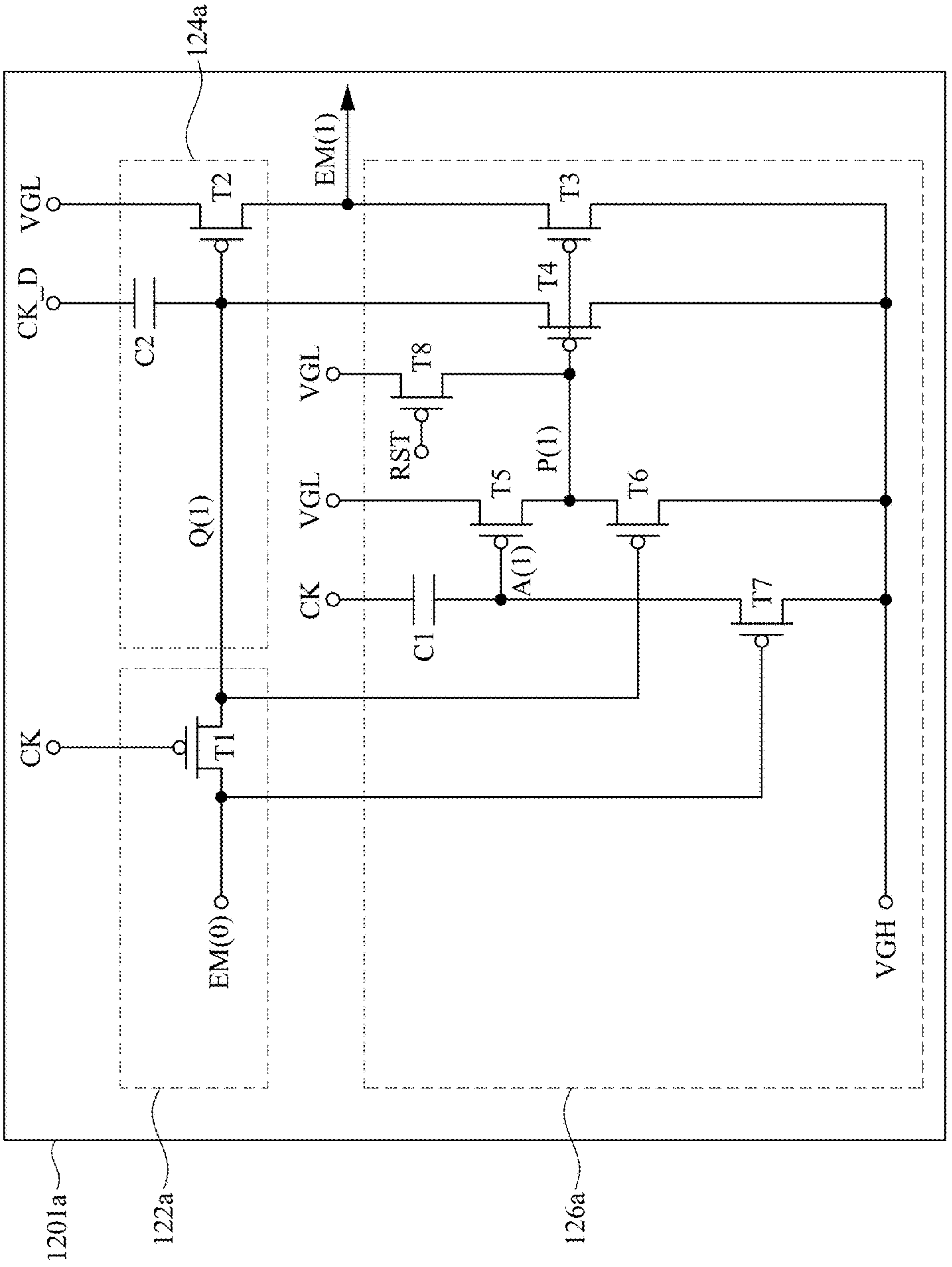
FIG. 2 is a circuit diagram of the light-emitting signal generating circuit in accordance with some embodiments of the present disclosure.

An aspect of the present disclosure discloses a light-emitting signal generating circuit. Referring to FIG. 1, FIG. 2 is a circuit diagram of a light-emitting signal generating circuit 1201*a* in accordance with some embodiments of the present disclosure.

In some embodiments, the light-emitting signal generating circuit 1201*a* in FIG. 2 corresponds to an odd-numbered circuit in FIG. 1: the light-emitting signal generating circuit 1201. For the sake of simplicity, only the structure of the light-emitting signal generating circuit 1201*a* would be explained here. The configurations of the odd-numbered circuits in the rest light-emitting signal generating circuits 1201-120*n* are the same as the configuration of the light-emitting signal generating circuit 1201*a*, and for the sake of simplicity, they would not be repeated here.

The light-emitting signal generating circuit 1201*a* includes an enabling module 122*a*, a driving module 124*a* and a discharging module 126*a*.

The enabling module 122*a* includes a transistor T1, a first terminal of the transistor T1 is configured to receive the light-emitting signal EM(0), a gate terminal of the transistor T1 is configured to receive the clock signal CK, and a second terminal of the transistor T1 is configured to generate a control signal Q(1).

The driving module 124*a* includes a transistor T2 and a capacitor C2. A first terminal of the transistor T2 is configured to receive the reference voltage VGL, a gate terminal of the transistor T2 is configured to receive the control signal Q(1), and a second terminal of the transistor T2 is configured to output the light-emitting signal EM(1). A first terminal of the capacitor C2 is configured to receive the clock signal CK_D, and a second terminal of the capacitor C2 is coupled to the second terminal of the transistor T1 and the gate terminal of the transistor T2.

The discharging module 126*a* includes transistors T3 to T8 and a capacitor C1. A first terminal of the transistor T3 is configured to connect to the second terminal of the transistor T2, a gate terminal of the transistor T3 is configured to receive a control signal P(1), and a second terminal of the transistor T3 is configured to receive the reference voltage VGH. A first terminal of the transistor T4 is coupled to the second terminal of the capacitor C2, a second terminal of the transistor T4 receives the reference voltage VGH, and a gate terminal of the transistor T4 receives the control signal P(1). A first terminal of the transistor T5 receives the reference voltage VGL, a second terminal of the transistor T5 receives the control signal P(1), and a gate terminal of the transistor T5 receives a control signal A(1). A first terminal of the transistor T6 is connected to the second terminal of the transistor T5, a second terminal of the transistor T6 receives the reference voltage VGH, and a gate terminal of the transistor T6 receives the control signal Q(1). A first terminal of the transistor T7 receives the control signal A(1), a second terminal of the transistor T7 receives the reference voltage VGH, and a gate terminal of the transistor T7 receives the light-emitting signal EM(0). A first terminal of the transistor T8 receives the reference voltage VGL, a second terminal of the transistor T8 receives the control signal P(1), and a gate terminal of the transistor T8 receives the reset signal RST. A first terminal of the capacitor C1 receives the clock signal CK, and a second terminal of the capacitor C1 receives the control signal A(1).

Figure 3:
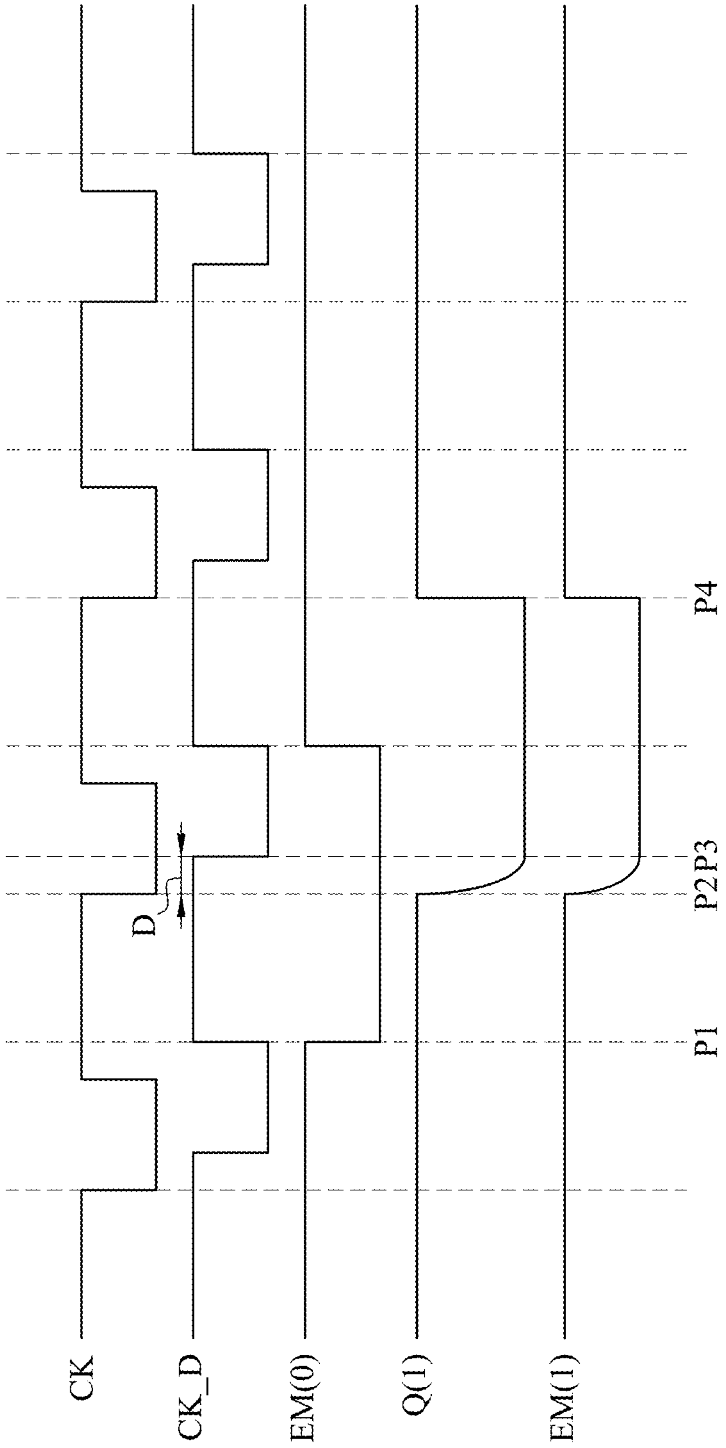
FIG. 3 is a schematic diagram of a driving waveform of the light-emitting signal generating circuit module in accordance with some embodiments of the present disclosure.

The discharging module 126*a* is electrically coupled to the second terminal of the transistor T2, and the discharging module 126*a* is configured to pull up the light-emitting signal EM(1) according to the falling edge of the clock signal CK, for example, at a time point P4 in FIG. 3.

FIG. 3 is a schematic diagram of a driving waveform of the light-emitting signal generating circuit 1201*a* in accordance with some embodiments of the present disclosure. The operation of the light-emitting signal generating circuit 1201 would be described below with reference in FIGS. 2 and 3 simultaneously.

FIG. 3 shows the waveform versus time correspondence diagram of the clock signal CK, the clock signal CK_D, the control signal Q(1), the light-emitting signals EM(0) and EM(1).

In FIG. 3, the clock signal CK and the clock signal CK_D partially overlap when both the clock signal CK and the clock signal CK_D are in same level. For example, the clock signal CK and the clock signal CK_D are both at the same level within the active time zone of a certain length of time. As shown in FIG. 3, both the clock signal CK and the clock signal CK_D are in high level between time points P1 to P2. There is a delay time D between the falling edge (rising edge) of the clock signal CK and the falling edge (rising edge) of the clock signal CK_D. In some embodiments, the length of the delay time D is between 0 second and a data signal length. In some embodiments, the data signal length could be 28 microseconds (us).

Referring to FIGS. 2 and 3 at the same time, the first terminal of the transistor T1 starts to receive the light-emitting signal EM(0) at the time point P1. The transistor T1 is conducted at the time point P2 in response to the clock signal CK received at the gate terminal switching to the low level, so as to switch the control signal Q(1) to the low level according to the light-emitting signal EM(0) which is at the low level. Between the time point P2 and the time point P3, the control signal Q(1) is not at the steady-state low level yet.

The capacitor C2 couples the clock signal CK_D to the control signal Q(1) at the time point P3 in response to the clock signal CK_D switching from the high level to the low level, and pulls down the level of the control signal Q(1) again according to the falling edge of the clock signal CK_D. A delay time length by which the falling edge of the clock signal CK_D lags behind the falling edge of the clock signal CK is less than half cycle of the clock signal CK or less than the data signal length.

During the period of the clock signal CK_D coupling with the control signal Q(1), the transistor T2 is operated in the linear region. The transistor T2 is conducted in response to the control signal Q(1) to pull down the light-emitting signal EM(1) according to the reference voltage VGL.

Figure 4:
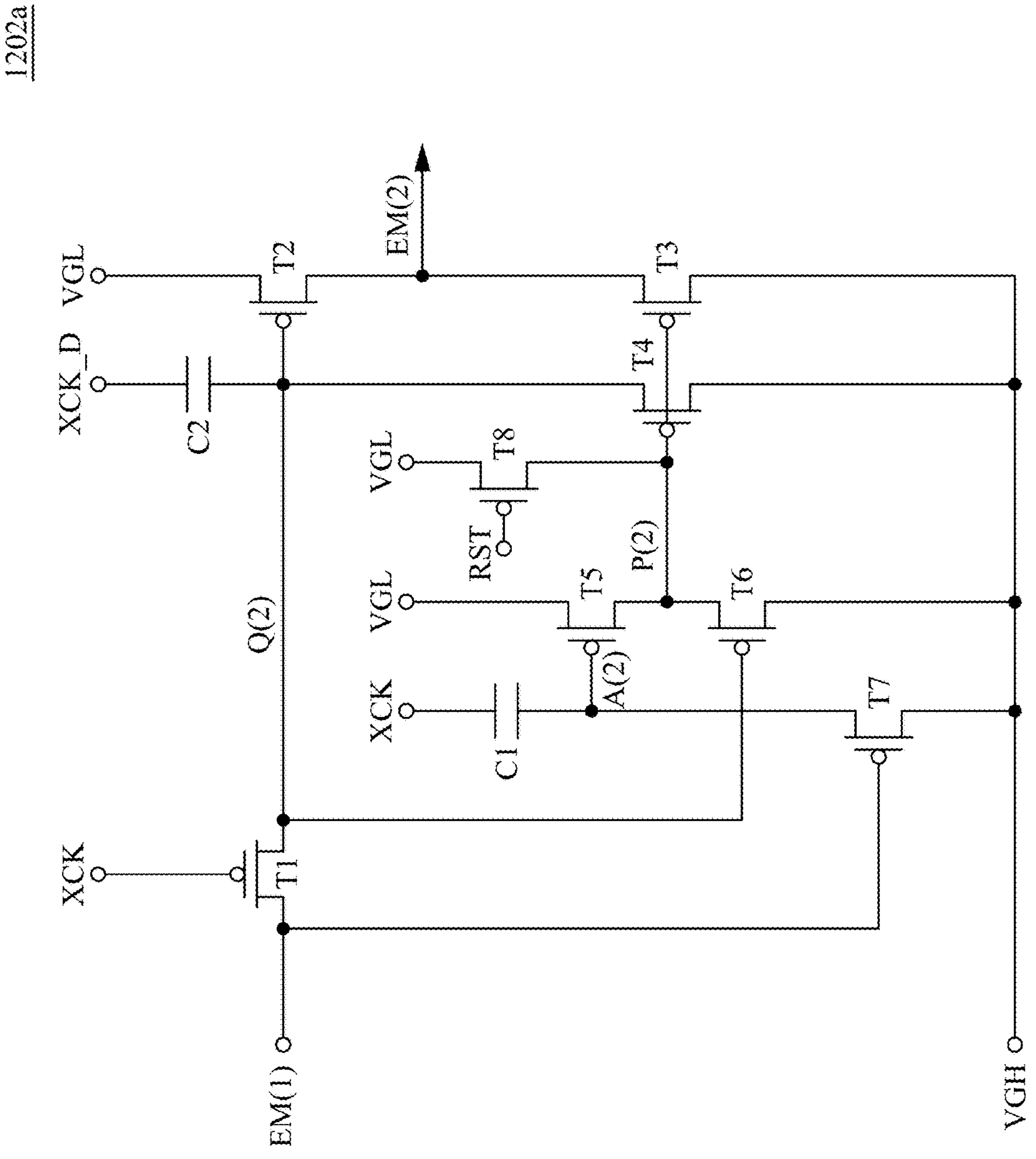
FIG. 4 is a circuit diagram of the light-emitting signal generating circuit in accordance with some embodiments of the present disclosure.

The light-emitting signal generating circuit 1202*a* in FIG. 4 corresponds to the even-numbered stage circuit in FIG. 1. The light-emitting signal generating circuit 1202*a* is similar to the light-emitting signal generating circuit 1202 in FIG. 1. Circuit structure of the light-emitting signal generating circuit 1202*a* would not be repeated here, but only the difference in the signals received by the light-emitting signal generating circuit 1201*a* would be explained. The configurations of the even-numbered circuits in the rest light-emitting signal generating circuits 1202-120*n* are the same as the configuration of the light-emitting signal generating circuit 1202*a*, and for the sake of simplicity, they would not be repeated here.

Compared with FIG. 2, the gate of the transistor T1 of the light-emitting signal generating circuit 1202*a* is conducted in response to the clock signal XCK, and the capacitor C2 couples the clock signal XCK_D and the control signal Q(2). The capacitor C1 couples the clock signal XCK and the control signal A(2).

Figure 5:
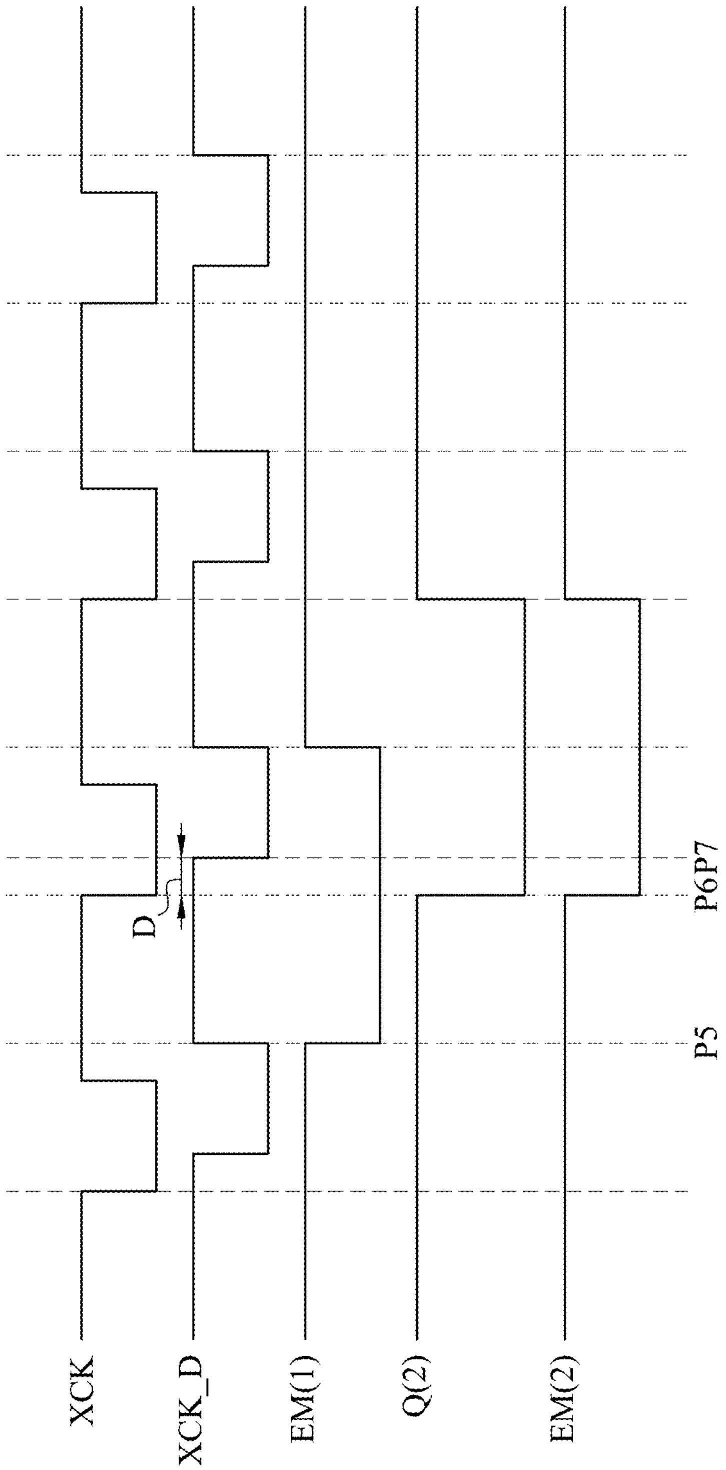
FIG. 5 is a schematic diagram of a driving waveform of the light-emitting signal generating circuit in accordance with some embodiments of the present disclosure.

FIG. 5 is a schematic diagram of a driving waveform of the light-emitting signal generating circuit 1202*a* in accordance with some embodiments of the present disclosure. FIG. 5 shows the waveform versus time correspondence diagram of the clock signal XCK, the clock signal XCK_D, the control signal Q(2), the light-emitting signals EM(1) and EM(2).

the clock signal XCK and the clock signal XCK_D partially overlap when both the clock signal XCK and the clock signal XCK_D are in same level. Both the clock signal XCK and the clock signal XCK_D are in high level between time points P5 to P6. There is a delay time D between the falling edge (rising edge) of the clock signal XCK and the falling edge (rising edge) of the clock signal XCK_D.

In some methods, the low (high) level period of the clock signal CK and the low (high) level period of the clock signal CK_D do not overlap, and there is no delay time D between them.

In these methods, during the period when the clock signal CK is active, the transistors T1 and T2 operate in the saturation region. Then the transistor T2 enters the linear region operation through the coupling effect of the capacitor C2. When the transistors T1 and T2 operate in the saturation region, the threshold voltages of the transistors T1 and T2 would affect the light-emitting signal EM(1), so the longer the transistors T1 and T2 operate in the saturation region, the greater their effect on the light-emitting signal would be more significant, and the fall time of the light-emitting signal EM(1) will lengthen with time.

Compared with some methods mentioned above, the embodiment in FIG. 3 can quickly complete the charging of the transistor T1 and the coupling effect of the capacitor C2, so that the transistor T2 can be operated in the linear region as soon as possible. Compared with some methods of the transistor T2 operating in the saturation region, the configuration of the disclosure can make the light-emitting signal EM(1) less affected by the characteristics of the transistor.

Figure 6:
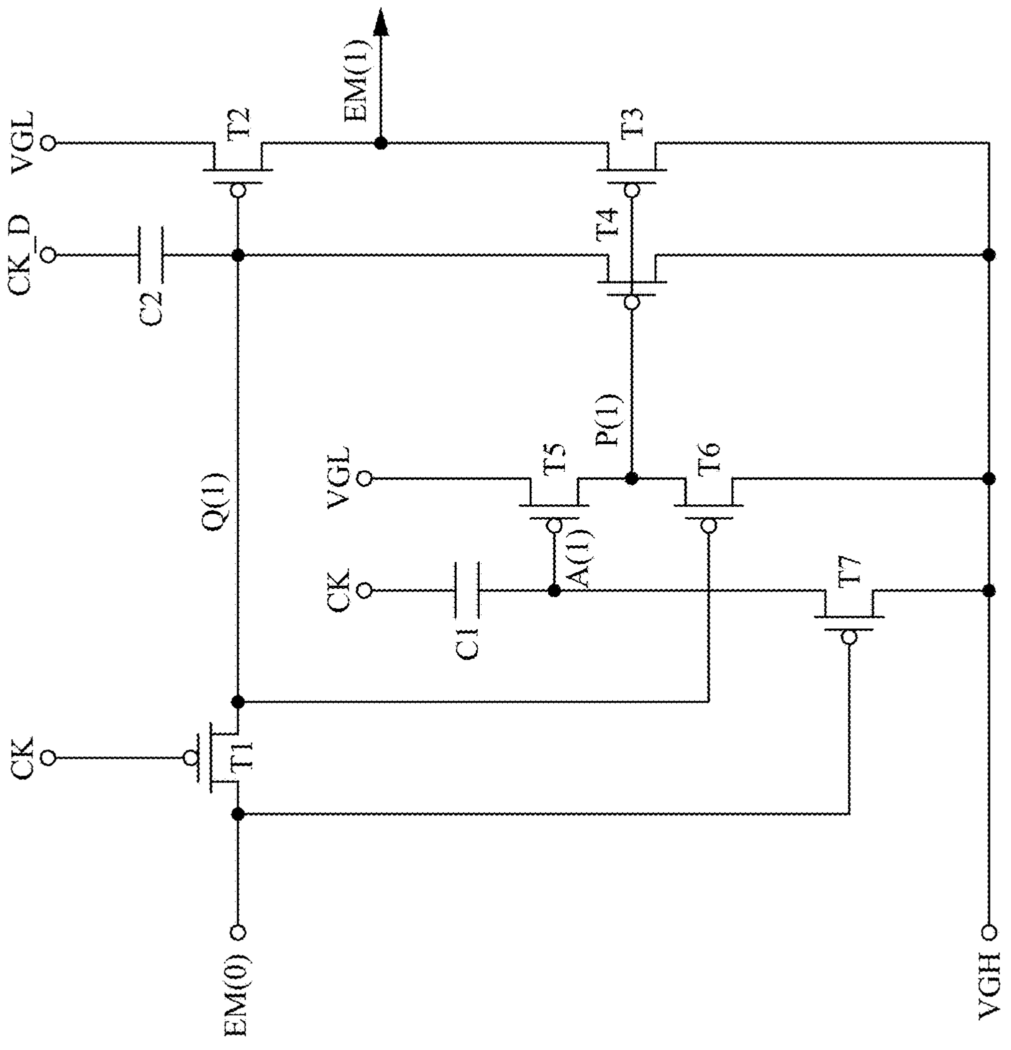
FIG. 6 is the light-emitting signal generating circuit of another aspect in accordance with some embodiments of the present disclosure.

FIG. 6 is the light-emitting signal generating circuit 1201*b* of another aspect in accordance with some embodiments of the present disclosure. The enabling module 122*a* and the driving module 124*a* in FIG. 6 are similar to the enabling module 122*a* and the driving module 124*a* in FIG. 2, so their connection configuration would not be repeated here. Compared with the embodiment in FIG. 2, the discharging module 126*a* in FIG. 6 does not have transistor T8, that is, there is no need for the reset signal RST to conduct transistor T8 to let the reference voltage VGL adjust the control signal P(1) in FIG. 6.

Figure 7:
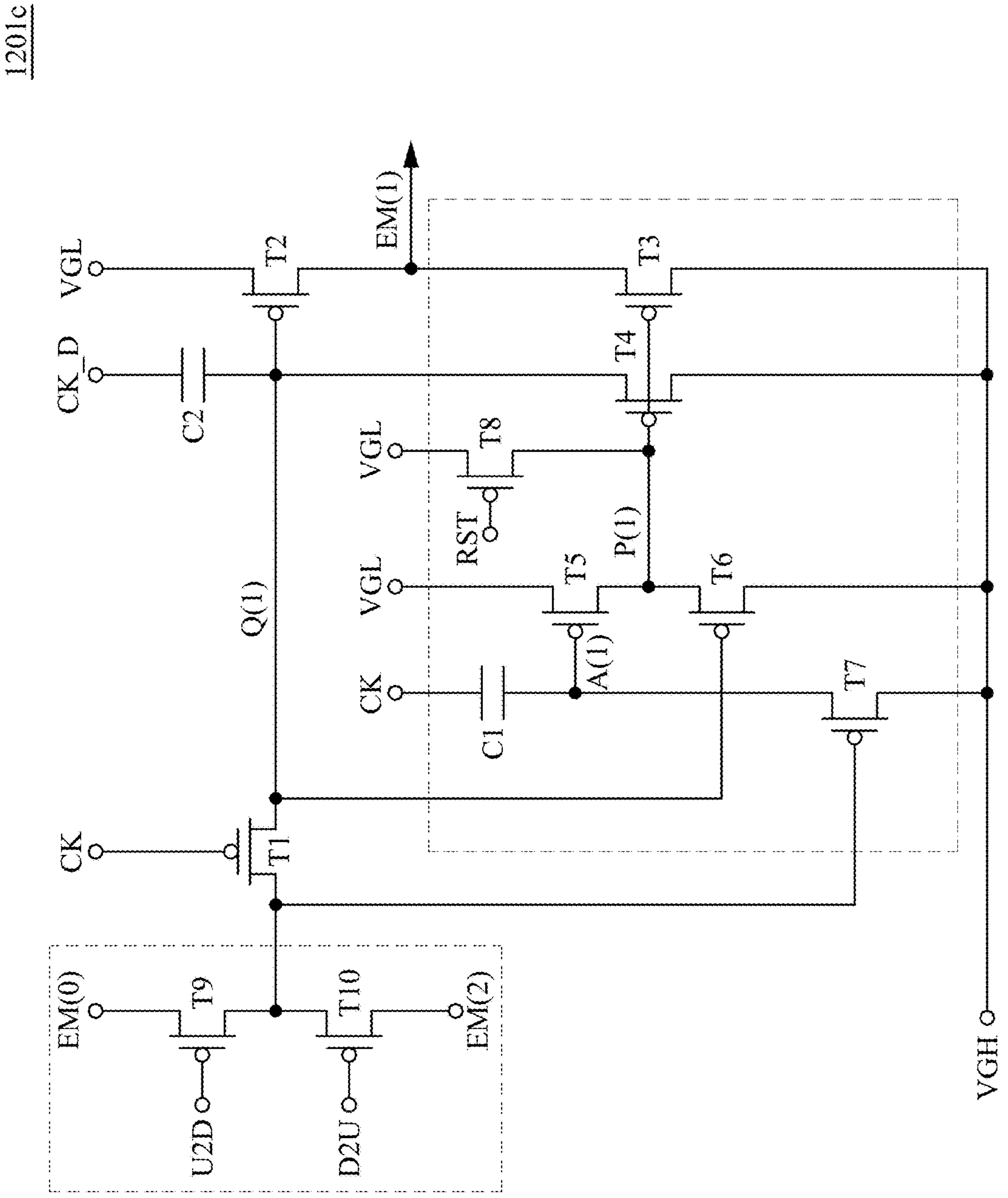
FIG. 7 is the light-emitting signal generating circuit of another aspect in accordance with some embodiments of the present disclosure.

FIG. 7 is the light-emitting signal generating circuit 1201*c* of another aspect in accordance with some embodiments of the present disclosure. The driving module 124*a* and the discharging module 126*a* in FIG. 7 are similar to the driving module 124*a* and the discharging module 126*a* in FIG. 2, so their connection configuration would not be repeated here.

Compared with the embodiment of FIG. 2, the transistor T1 in FIG. 7 is further coupled to transistors T9 and T10. A first terminal of the transistor T9 receives the light-emitting signal EM(0), a second terminal of the transistor T9 is connected to the first terminal of the transistor T1, and a gate terminal of the transistor T9 receives a forward scanning signal U2D. A first terminal of the transistor T10 is connected to the first terminal of the transistor T1, a second terminal of the transistor T10 receives the light-emitting signal EM(2), and a gate terminal of the transistor T10 receives a reverse scanning signal D2U. The configuration of transistors T9 and T10 in FIG. 7 can achieve the bidirectional scanning function.

For example, when the transistor T9 has the low level and is conducted in response to the forward scanning signal U2D, the transistor T9 would pull down the control signal Q(1) through the previous stage light-emitting signal EM(0), and then the capacitor C2 couples the control signal Q(1) and the clock signal CK_D to further pull down the control signal Q(1). The transistor T2 is conducted in response to the control signal Q(1) to generate the light-emitting signal EM(1). In other examples, when the transistor T10 has the low level and is conducted in response to the reverse scanning signal D2U, the transistor T10 would pull down the control signal Q(1) with the next stage light-emitting signal EM(2).

Figure 8:
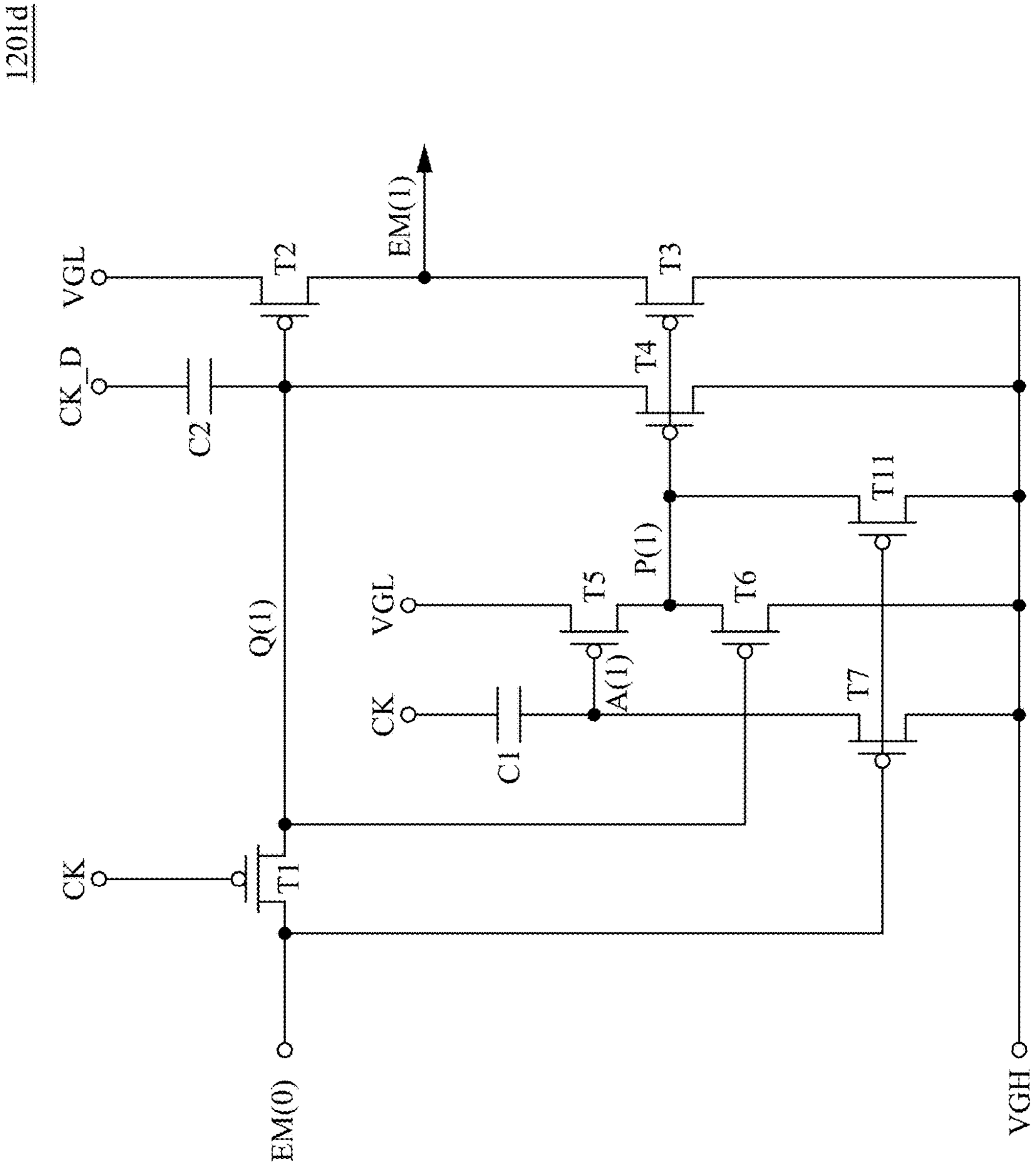
FIG. 8 is the light-emitting signal generating circuit of another aspect in accordance with some embodiments of the present disclosure.

FIG. 8 is the light-emitting signal generating circuit 1201*d* of another aspect in accordance with some embodiments of the present disclosure. An enabling module 122*a* and a driving module 124*a* in FIG. 8 are similar to the enabling module 122*a* and the driving module 124*a* in FIG. 2, so their connection configuration would not be repeated here. Compared with the embodiment in FIG. 2, in the embodiment in FIG. 8, a discharging module 126*a* includes a transistor T11. A first terminal of the transistor T11 is configured to adjust the control signal P(1), a second terminal of the transistor T11 is configured to receive the reference voltage VGH, and a gate terminal of the transistor T11 is configured to receive the light-emitting signal EM(0). In terms of operation, the control signal P(1) in the embodiment in FIG. 8 is turned off early to increase the driving capability.

In summary, the light-emitting signal generating circuit of the present disclosure generates a delayed clock signal through a pulse delay module, so that the TFT drive can quickly enter the linear region, and the waveform of the light-emitting signal may not be affected by the threshold voltage shift of the TFT. Through this operation, the fall time of the light-emitting signal waveform cannot be affected by the TFT, so that the EPWM corrected by optical compensation would not produce optical defects over time.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A light-emitting signal generating circuit, comprising:

a first transistor, comprising a first terminal for receiving a first light-emitting signal, a gate terminal for receiving a first clock signal, and a second terminal for generating a control signal;

a second transistor, comprising a first terminal for receiving a first reference voltage, a gate terminal, and a second terminal for outputting a second light-emitting signal; and a first capacitor, comprising a first terminal for receiving a second clock signal and a second terminal coupled to the second terminal of the first transistor and the gate terminal of the second transistor, wherein a low level period of the first clock signal partially overlaps with a low level period of the second clock signal, a high level period of the first clock signal partially overlaps with a high level period of the second clock signal, and a falling edge of the second clock signal lags behind a falling edge of the first clock signal, wherein during a period of the second clock signal coupling with the control signal through the first capacitor, the second transistor is operated in linear region.

2. The light-emitting signal generating circuit of claim 1, wherein the second transistor is configured to lower a level of the second light-emitting signal.

3. The light-emitting signal generating circuit of claim 2, wherein when the first clock signal conducts the first transistor and the control signal starts being switched to a low level but is not at a steady-state low level yet, the control signal is pulled down through a coupling effect of the first capacitor based on the falling edge of the second clock signal.

4. The light-emitting signal generating circuit of claim 3, wherein when the control signal is pulled down through the coupling effect of the first capacitor based on the falling edge of the second clock signal, the second transistor is operated in linear region.

5. The light-emitting signal generating circuit of claim 3, wherein a delay time length by which the falling edge of the second clock signal lags behind the falling edge of the first clock signal is less than half cycle of the first clock signal or less than a data signal length.

6. The light-emitting signal generating circuit of claim 5, wherein the data signal length is 28 microseconds (us).

7. The light-emitting signal generating circuit of claim 1, further comprising:

a third transistor, comprising a first terminal for receiving the first light-emitting signal, a gate terminal for receiving a first scanning signal and a second terminal; and a fourth transistor, comprising a first terminal, a gate terminal for receiving a second scanning signal, and a second terminal for receiving a third light-emitting signal.

8. The light-emitting signal generating circuit of claim 1, further comprising:

a discharging module, electrically coupled to the second terminal of the second transistor, wherein the discharging module is configured to pull up the second light-emitting signal according to the falling edge of the first clock signal.

9. The light-emitting signal generating circuit of claim 8, wherein the discharging module further comprising:

a third transistor, comprising a gate terminal for receiving the first light-emitting signal, a first terminal for adjusting a second control signal in response to the first light-emitting signal, and a second terminal for receiving a second reference voltage.

10. A display device, comprising:

a plurality of pixel units;

a plurality of light-emitting signal generating circuits, each of the light-emitting signal generating circuits comprises:

a first transistor, comprising a first terminal for receiving a previous stage light-emitting signal, a gate terminal for receiving a first clock signal, and a second terminal for generating a control signal;

a second transistor, comprising a first terminal for receiving a first reference voltage, a gate terminal, and a second terminal for outputting a present stage light-emitting signal to one of the pixel units; and a first capacitor, comprising a first terminal for receiving a second clock signal and a second terminal coupled to the second terminal of the first transistor and the gate terminal of the second transistor; and a delay circuit, configured to delay the first clock signal to generate a second clock signal and transmit the second clock signal to the light-emitting signal generating circuits, wherein a low level period of the first clock signal partially overlaps with a low level period of the second clock signal, a high level period of the first clock signal partially overlaps with a high level period of the second clock signal, and a falling edge of the second clock signal lags behind a falling edge of the first clock signal, wherein during a period of the second clock signal coupling with the control signal through the first capacitor, the second transistor is operated in linear region.

11. The display device of claim 10, wherein the second transistor is configured to lower a level of the present stage light-emitting signal.

12. The display device of claim 11, wherein when the first clock signal conducts the first transistor and the control signal starts being switched to a low level but is not at a steady-state low level yet, the control signal is pulled down through a coupling effect of the first capacitor based on the falling edge of the second clock signal.

13. The display device of claim 12, wherein when the control signal is pulled down through the coupling effect of the first capacitor based on the falling edge of the second clock signal, the second transistor is operated in linear region.

14. The display device of claim 12, wherein a delay time length by which the falling edge of the second clock signal lags behind the falling edge of the first clock signal is less than half cycle of the first clock signal or less than a data signal length.

15. The display device of claim 14, wherein the data signal length is 28 microseconds (us).

* * * * *